Feb. 23, 1926.
H. N. WESSON
AUTOMOBILE SIGNAL
Filed Jan. 17, 1925   2 Sheets-Sheet 1
Fig. 1.
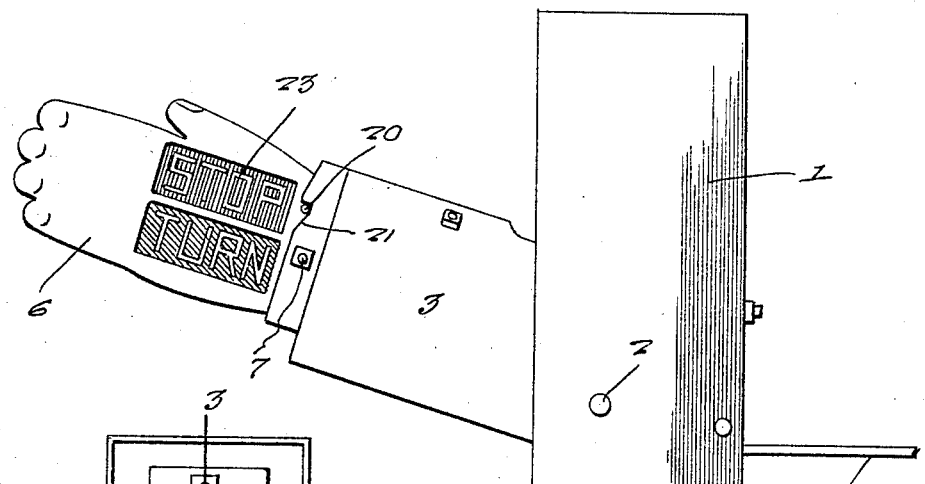
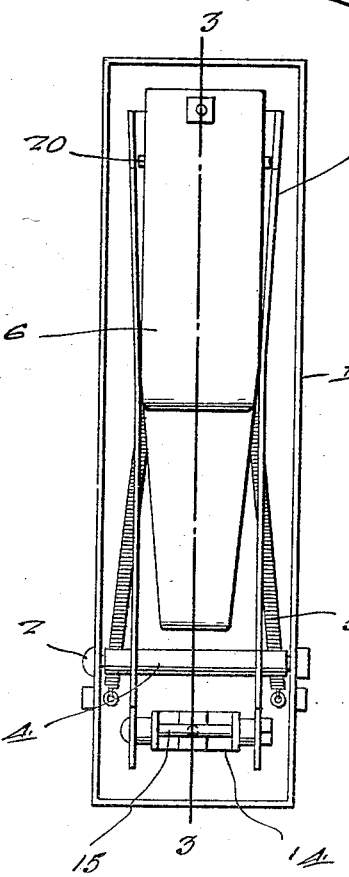
Fig. 2.
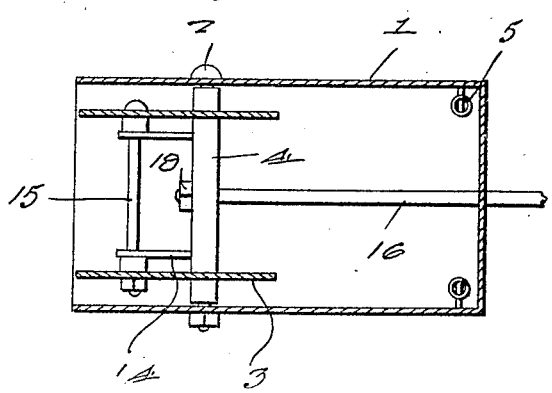
Fig. 5.
Inventor
H. N. Wesson.
By
Clarence O. J. Dixon
Attorney

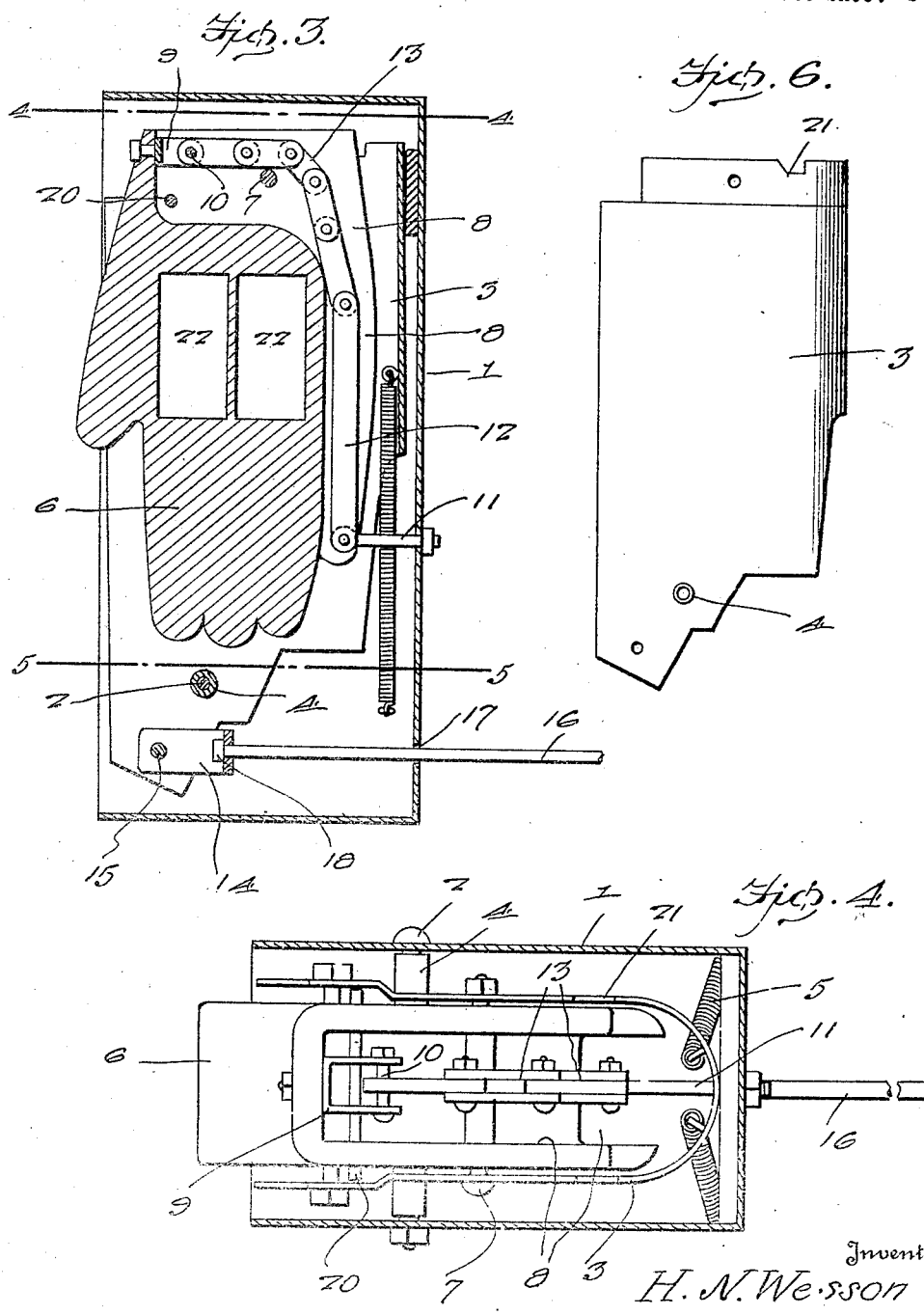

Patented Feb. 23, 1926.

1,573,887

UNITED STATES PATENT OFFICE.

HENRY NEWTON WESSON, OF ATTALLA, ALABAMA.

AUTOMOBILE SIGNAL.

Application filed January 17, 1925. Serial No. 3,146.

*To all whom it may concern:*

Be it known that I, HENRY N. WESSON, a citizen of the United States, residing at Attalla, in the county of Etowah and State of Alabama, have invented certain new and useful Improvements in an Automobile Signal, of which the following is a specification.

This invention relates to improvements in automobile signals and has for its principal object to provide a simple and efficient means whereby the direction to be pursued by the automobile upon which the signal is mounted may be indicated by the operation of a signaling arm and hand manually controlled by the operator of the automobile.

One of the important objects of the present invention is to provide an automobile signal of the above mentioned character, which is of such construction as to enable the same to be readily and easily installed upon an automobile, the device being further positive and efficient in its operation.

A further object is to provide an automobile signal of the above mentioned character, wherein means is associated therewith for rendering the same visible by approaching or pursuing vehicles at night as well as in the day time.

A still further object of the invention is to provide an automobile signal of the above mentioned character, which is simple in construction, inexpensive, strong and durable and further well adapted for the purposes for which it is designated.

Other objects and advantages will become apparent during the course of the following description.

In the accompanying drawing, forming a part of this specification and in which like numerals designate like parts throughout the same:

Figure 1 is a side elevation of the automobile signal embodying my invention showing the signaling arm and hand during its movement to an operative position.

Figure 2 is an end elevation.

Figure 3 is a sectional view taken approximately on line 3—3 of Figure 2.

Figure 4 is a transverse section taken on line 4—4 of Figure 3.

Figure 5 is a similar section taken on line 5—5 of Figure 3, and

Figure 6 is a detail side elevation of the arm.

In the drawings wherein for the purpose of illustration is shown the preferred embodiment of my invention, the numeral 1 designates a casing, the outer side of which is open as clearly illustrated in Figure 3. The casing 1 is adapted to be secured on the side of the automobile body preferably adjacent the windshield frame, although the same may be secured in any other suitable place and I do not wish to limit myself to the particular position on the automobile at which the device is secured. A pivot bolt 2 extends transversely in the lower portion of the casing 1 adjacent the open side thereof, and the purpose thereof will be presently described.

The arm forming a part of the present signaling device is indicated generally by the numeral 3 and the same is formed of sheet metal and is substantially of U-shaped configuration in cross section as clearly illustrated in Figure 4. The lower rear portion of the substantially U-shaped arm 3 is cut away as more clearly illustrated in Figures 3 and 6 of the drawings. It is of course to be understood that the closed portion of the arm is adapted to be normally disposed adjacent the closed side of the casing 1. A sleeve 4 extends transversely through the lower portion of the arm 3 adjacent the open side thereof for receiving the pivot bolt 2 whereby the arm is pivotally supported within the casing 1.

A pair of coil springs such as are shown at 5 are connected at their upper ends to the back portion of the intermediate portion of the arm, the lower ends of the coil springs being secured to the front and rear sides of the casing 1 adjacent the lower end thereof. The purpose of the coil springs is to provide a means for normally retaining the arm 3 in its inoperative position within the casing 1.

Pivotally supported in the upper portion of the arm 3 is the inner end of the arm hand 6, the pivotal supporting means being indicated at 7. The inner and lower portion of the signaling hand 6 is cut away as indicated generally at 8 with reference more particularly to Figure 3. The purpose of this construction will also hereinafter be more fully described.

A substantially U-shaped bracket 9 is secured in the cut out portion 8 of the inner end of the signaling hand 6. A pin 10 extends transversely through the free ends of the arms of the U-shaped bracket 9. Extending inwardly from the intermediate portion of the closed side of the casing 1 is an eye bolt 11. A pair of relatively long links such as are shown at 12 are secured at their lower ends to the inner end of the eye bolt 11, said links being normally disposed within the cut out portion formed in the bottom of the hand 6. The opposite ends of the elongated links 12 are operatively connected to the transversely extending pin 10 supported in the U-shaped bracket 9 through the series of interconnected smaller links 13, the latter being also disposed in the cut out portion 8 of the hand 6. The purpose of the flexible connection between the outer end of the inner portion of the hand and the eye bolt 11 will hereinafter be more fully elucidated.

Substantially U-shaped member 14 has the free ends of the arms thereof supported on the transversely extending pin 15, the latter being disposed below the pivot bolt 2 and forwardly thereof as clearly illustrated in Figure 3. An operating lever 16 is adapted for slidable movement through a suitable opening 17 provided therefor in the closed side of the casing 1 adjacent the lower end thereof, the outer end of the lever being secured to the crown portion of the U-shaped member 14 as illustrated at 18. The opposite end of the lever may be secured to any suitable operating means such as a foot or hand lever, or magnetically controlled means.

Normally the parts of the present signaling device are disposed in the position as shown in Figure 3 wherein the signaling hand is confined within the U-shaped arm 3 and the latter is disposed within the casing 1 entirely out of view. When the operator of the automobile upon which the signal is mounted desires to make a turn or stop the vehicle, the handle of the lever 16 which is located in close proximity to the operator is moved inwardly causing the arm 3 to swing outwardly of the casing 1 on its pivot 2, against the tension of the coil springs 5. During the outward swinging movement of the arm 3, a pull will be exerted on the links 12 and 13 and as a result, the signaling hand 6 will be caused to swing on its pivot 7 whereby the signaling hand will move outwardly of the signaling arm 3 so as to be disposed in an operative position. A pin 20 extends transversely through the inner end of the signaling hand 6 adjacent the outer end thereof and the ends of the pin engage suitable notches 21 provided in the upper edge of the U-shaped signaling arm 3 whereby the upward swinging movement of the arm is limited.

A further inward movement of the lever 16 will cause the signaling arm 3 and the signaling hand 6 associated therewith to be disposed in a substantially horizontal position so that the signal may be readily visible to approaching as well as pursuing vehicles. Furthermore, the signaling arm and hand are of such design as to simulate the coat sleeve and the hand of the operator of the automobile. In order that the signal may be readily visible at night, the signaling hand is provided with the compartment 22, any number of which may be provided as is desired. In each of these compartments is placed the glass panels 23, the same having suitable indicia thereon and the same are adapted to be illuminated in any suitable manner such as is well known in the art.

After the automobile has made the desired turn or has come to a complete stop, the handle 19 is released and the spring 5 will return the signaling arm and the signaling hand to their normal inoperative positions.

It will thus be seen from the foregoing description, that an automobile signal has been provided which is of such construction as to enable the same to be readily and easily installed on an automobile without materially altering the latter, the operating means therefor being further disposed within easy access of the operator so as to render the actuation of the signaling means efficient and positive at all times.

While I have shown the preferred embodiment of my invention, it is to be understood that various changes in the size, shape and arrangement of parts may be resorted to without departing from the spirit of the invention and the scope of the appended claims.

Having thus described the invention, what I claim is:—

1. An automobile signal comprising a casing open at its side, a substantially U-shaped arm pivotally supported adjacent its outer lower end in said casing, a signaling hand pivotally supported at its inner end in the upper portion of said arm and normally disposed therein, a lever slidably supported in the closed side of the casing, the outer end thereof being secured to the lower outer end of the arm for swinging the same outwardly of the casing, means for moving said signaling hand outwardly to an operative position during the outward swinging movement of said arm, means for limiting the upward swinging movement of said hand with respect to said arm, and means for returning the arm and the signaling hand to their normally inoperative positions.

2. An automobile signal comprising a casing open at its side, a substantially U-shaped arm pivotally supported adjacent its outer lower end in said casing, a signaling hand pivotally supported at its inner end in the upper portion of said arm and normally disposed therein, a lever slidably supported in the closed side of the casing, the outer end thereof being secured to the lower outer end of the arm for swinging the same outwardly of the casing, a flexible connection between the outer portion of the inner end of the hand and the intermediate portion of the closed side of the casing for facilitating the movement of the hand outwardly to an operative position during the outward swinging movement of said arm, and means for returning the arm and the signaling hand to their normally inoperative positions.

3. An automobile signal comprising a casing open at its side, a substantially U-shaped arm pivotally supported adjacent its outer lower end in said casing, a signaling hand pivotally supported at its inner end in the upper portion of said arm and normally disposed therein, a lever slidably supported in the closed side of the casing, the outer end thereof being secured to the lower outer end of the arm for swinging the same outwardly of the casing, a flexible connection between the outer portion of the inner end of the hand and the intermediate portion of the closed side of the casing for facilitating the movement of the hand outwardly to an operative position during the outward swinging movement of said arm, means for limiting the upward swinging movement of the signaling hand with respect to said arm, and means for returning the arm and said signaling hand to their normally inoperative positions.

In testimony whereof I affix my signature.

HENRY NEWTON WESSON.